United States Patent
Lin et al.

(10) Patent No.: US 8,726,097 B2
(45) Date of Patent: May 13, 2014

(54) DEBUGGING METHOD AND COMPUTER SYSTEM USING THE SAME

(75) Inventors: Yu-Tzu Lin, New Taipei (TW); Yuan-Chan Lee, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 288 days.

(21) Appl. No.: 13/233,030

(22) Filed: Sep. 15, 2011

(65) Prior Publication Data

US 2012/0278655 A1  Nov. 1, 2012

(30) Foreign Application Priority Data

Apr. 27, 2011  (TW) .............................. 100114614 A

(51) Int. Cl.
*G06F 11/00* (2006.01)
(52) U.S. Cl.
USPC .............................................. 714/45; 714/36
(58) Field of Classification Search
USPC ...................... 714/36, 45; 713/1, 2
See application file for complete search history.

(56) References Cited

U.S. PATENT DOCUMENTS

| | | | |
|---|---|---|---|
| 2005/0060526 A1* | 3/2005 | Rothman et al. | 713/1 |
| 2008/0141073 A1* | 6/2008 | Shih et al. | 714/36 |
| 2009/0091538 A1* | 4/2009 | Lan | 345/172 |
| 2009/0144585 A1* | 6/2009 | Lu | 714/36 |
| 2010/0058314 A1* | 3/2010 | Wang | 717/168 |
| 2010/0287363 A1* | 11/2010 | Thorsen | 713/2 |
| 2011/0219224 A1* | 9/2011 | Kita | 713/2 |

* cited by examiner

*Primary Examiner* — Michael Maskulinski
(74) *Attorney, Agent, or Firm* — Winston Hsu; Scott Margo

(57) ABSTRACT

A debugging method for a computer system is disclosed, which includes defining a debug reference data area in a storage device for a BIOS and a control device, periodically transmitting a reply request including an identification information to the BIOS, transmitting reply information corresponding to the identification information according to the reply request, checking the reply information and storing an execution log data into the debug reference data area when the identification information does not conform to the original identification information, determining whether the computer system is in normal operation, and performing a debugging process according to the execution log data when the computer system is in abnormal operation.

16 Claims, 3 Drawing Sheets

DEBUGGING METHOD AND COMPUTER SYSTEM USING THE SAME

BACKGROUND OF THE INVENTION

1. Field of the Invention

The present invention relates to a debugging method and related computer system, and more particularly, to a debugging method and related computer system which do not require additional hardware and are capable of obtaining complete execution log data to perform debugging.

2. Description of the Prior Art

When computer devices crash or are not able to boot normally, related peripherals would fail to work. Thus, various debugging methods are employed to discover the cause of the malfunction, to facilitate subsequent recovery procedures. For example, the prior art usually determines a cause of malfunction to locate the malfunction by checking power-on self test (POST) codes on port 80 (address 0x80), or using serial-out methods to monitor system operation processes. However, when abnormalities occur in computer devices, POST codes on port 80 only display information at a certain interruption point, and do not provide sufficient debugging information. Serial-out methods are often restricted by interface transmission rates and cause system delay (since processors have far exceeding processing rates), resulting in data loss of the debugging information.

Another conventional debugging method is to trace the cause of system abnormalities by tracking execution log data recorded by a Basic input/output system (BIOS). However, related execution log data cannot be completely preserved when the computer devices fail to complete a boot procedure. Especially, execution log data during actual abnormal operations cannot be stored, and thus it is difficult to determine the cause of occurrence of boot error, and to implement debugging procedures accordingly.

On the other hand, the aforementioned conventional methods all need to be implemented with extra hardware, which poses a major inconvenience for computer device developers and designers, and also raises manufacturing costs and system design complexity.

SUMMARY OF THE INVENTION

Therefore, the present invention primarily provides a debugging method and related computer system.

According to the claimed invention, a debugging method for a computer system comprises defining a debug reference data area in a storage device for a basis input/output system (BIOS) and a control device; utilizing the control device to periodically transmit a reply request comprising an identification information to the BIOS; utilizing the BIOS to transmit a reply information corresponding to the identification information according to the reply request; utilizing the control device to check the reply information and storing an execution log data into the debug reference data area of the storage device when the identification information included in the reply information does not conform to the original identification information transmitted by the control device; determining whether the computer system is in a normal operation; and performing a debugging process of the computer system according to the execution log data when the determination result indicates the computer system is in an abnormal operation.

According to the claimed invention, a computer system comprises a storage device; a basis input/output system (BIOS), for defining a debug reference data area in the storage device; a control device, for periodically transmitting a reply request comprising an identification information to the BIOS; and a temporary memory, for temporarily storing an execution log data; wherein the control device checks the reply information after the BIOS transmits a reply information corresponding to the identification information according to the reply request, and when the identification information included in the reply information does not conform to the original transmitted identification information, the control device stores the execution log data in the temporary memory into the debug reference data area of the storage device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
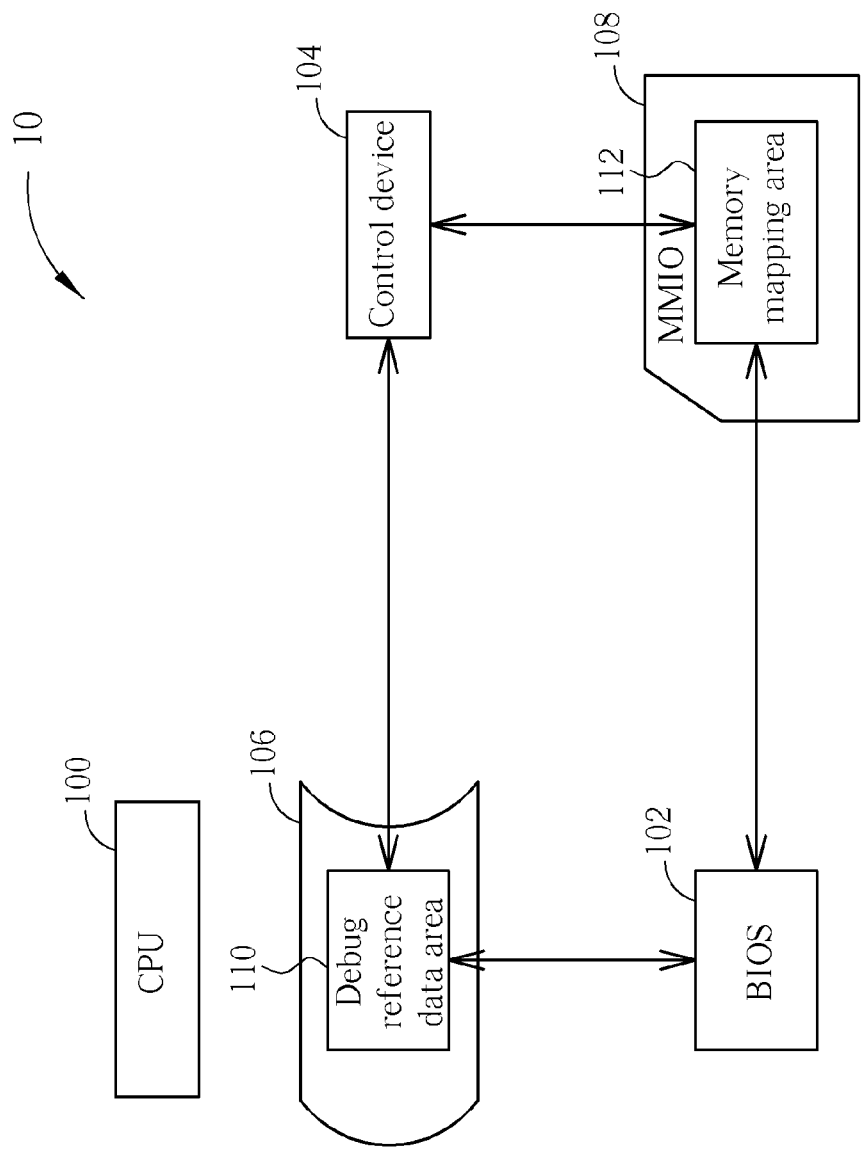
FIG. 1 is a schematic diagram of a computer system according to an embodiment of the invention.

Please refer to FIG. 1, which is a schematic diagram of a computer system 10 according to an embodiment of the invention. The computer system 10 can be used for storing an execution log data generated during operation of the system for debugging purposes. As shown in FIG. 1, the computer system 10 includes a central processing unit (CPU) 100, a basic input/output system (BIOS) 102, a control device 104, a storage device 106, and a temporary memory 108, wherein the BIOS 102 loads and executes a BIOS code via the CPU 100 to implement related functionalities. The control device 104 may be a keyboard controller or an embedded controller. The storage device 106 may be any memory device capable of retaining data after power loss, e.g. a Flash memory, a programmable read-only memory (PROM) or an Electrically Erasable Programmable read-only memory (EEPROM), but not limited thereto. In this embodiment, the BIOS 102 and the control device 104 may access data from the storage device 106 and the temporary memory 108. For example, as shown in FIG. 1, the BIOS 102 and the control device 104 can access data from a memory mapping area 112 of the temporary memory 108 by means of memory-mapped input/output (MMIO).

Figure 2:
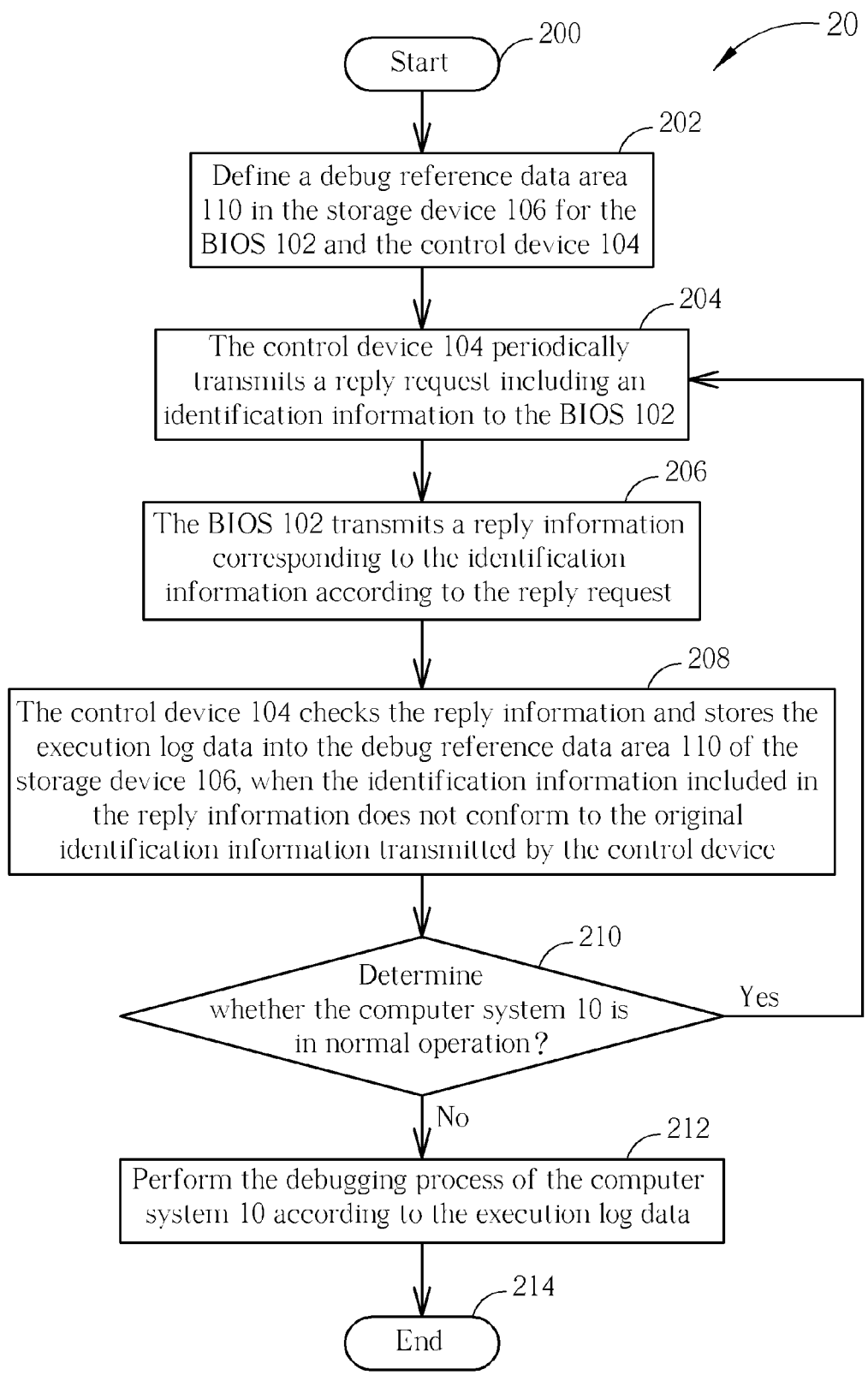
FIG. 2 is a schematic diagram of a process according to an embodiment of the invention.

A method of completely preserving the execution log data in the storage device 106 and performing the debugging process in the computer system 10 accordingly may be summarized into a process 20, as shown in FIG. 2. Note that, an ordering of steps in the process 20 is not limited to that shown in FIG. 2, provided that achieved results are substantially the same. The process 20 includes the following steps:

Step 200: Start.

Step 202: Define a debug reference data area 110 in the storage device 106 for the BIOS 102 and the control device 104.

Step 204: The control device 104 periodically transmits a reply request including an identification information to the BIOS 102.

Step 206: The BIOS 102 transmits a reply information corresponding to the identification information according to the reply request.

Step 208: The control device 104 checks the reply information and stores the execution log data into the debug reference data area 110 of the storage device 106, when the identification information included in the reply information does not conform to the original identification information transmitted by the control device.

Step 210: Determine whether the computer system 10 is in normal operation. If so, go to Step 204; else go to Step 212.

Step 212: Perform the debugging process of the computer system 10 according to the execution log data.

Step 214: End.

Firstly, according to Step 202 of the process 20, the BIOS 102 defines a debug reference data area 110 in the storage device 106 to provide a dedicated storage space for storing the execution log data. In other words, the debug reference data area 110 is reserved exclusively for the BIOS 102 and the control device 104, and is not corrupted by the operating system or other programs. In more detail, the BIOS 102 may first allocate a reserved storage area in the storage device 106, and then notify the control device 104 of a size and range of the reserved storage area. Next, the BIOS 102 must confirm whether the control device 104 is able to access data in the reserved storage area; if the control device 104 is unable to access data in the reserved storage area, the BIOS 102 re-allocates another storage space in the storage device 106. If the control device 104 is indeed capable of accessing data in the allocated reserved storage area, the BIOS 102 further defines the reserved storage area allocated in the storage device 106 as a debug reference data area 110. For example, the BIOS 102 may specify a specific region in the storage device 106 as the debug reference data area 110 during an initialization procedure of the storage device 106 via a declare command (e.g. an Operation Region command in an advanced configuration and power interface (ACPI)).

Generally, execution log data generated during operation of the BIOS 102 or the computer system 10 would be written into the temporary memory 108. Therefore, in Step 202, after the debug reference data area 110 has been defined, the BIOS 102 may start storing the execution log data previously written into the temporary memory 108 to the debug reference data area 110, and notify the control device 104 to start performing an execution log data service. In other words, after the debug reference data area 110 is defined, during operation of the BIOS 102, the corresponding execution log data already written into the temporary memory 108 can be stored into the debug reference data area 110 of the storage device 106 by the BIOS 102. As such, preferably the BIOS 102 periodically (at intervals of a write cycle) stores the execution log data in the temporary memory 108 to the debug reference data area 110 of the storage device 106.

Next, in Step 204, after the debug reference data area 110 has been defined, or after receiving notification to start performing the execution log data service from the BIOS 102, the control device 104 would start to transmit the reply request including the identification information to the BIOS 102, and continuously transmits the reply request including the identification information to the BIOS 102 at fixed time intervals. In other words, the control device 104 periodically transmits the reply request to the BIOS 102 until the system stops operating, or until a termination command is received. For example, before the control device 104 shuts off a system power supply, the control device 104 would stop transmitting the reply request. Alternatively, after receiving the termination command from the BIOS 102, the control device 104 would stop transmitting the reply request.

In Step 206, after receiving the reply request, the BIOS 102 would transmit the reply information corresponding to the identification information according to the reply request, wherein the reply information may include the identification information in the reply request and other related information. For example, assuming the identification information is "0010", then the BIOS 102 would transmit a reply information accordingly (with a content "0010"). Simply put, the control device 104 transmits the corresponding reply information to the BIOS 102 as a means of verification. When the BIOS 102 also correctly transmits the corresponding reply information as anticipated, it means the BIOS 102 is currently in normal operation; conversely, it means abnormal operation may have occurred in the BIOS 102. As such, through Steps 204 and 206, it is possible to establish a handshake mechanism between the BIOS 102 and the control device 104, and the control device may determine an operational status of the BIOS 102 accordingly.

In Step 208, the control device 104 checks the reply information transmitted by the BIOS 102, and when the identification information in the reply information does not conform to the original identification information transmitted by the control device 104, the execution log data is stored into the debug reference data area 110 of the storage device 106 by the control device 104. In other words, the control device 104 starts detecting whether the BIOS 102 has transmitted the reply information after transmitting the reply request (Step 204). After detecting the reply information from the BIOS 102, the control device 104 checks whether the identification information in the reply information conforms to the original transmitted identification information. If the identification information in the reply information conforms to the original transmitted identification information, it means the BIOS 102 is in normal operation. If the identification information in the reply information does not conform to the original transmitted identification information, it means the BIOS 102 is in abnormal operation. For example, the identification information sequentially transmitted by the control device 104 is "0010", "0011", and "0100", and the BIOS 102 correspondingly transmits the reply information "0010", "0011", and "0111". In such a case, since the last reply information does not match the identification information transmitted by the control device 104, it may be determined the BIOS 102 is in abnormal operation. Therefore, when the identification information in the reply information does not conform to the original identification information, the control device 104 would store the execution log data into the debug reference data area 110 of the storage device 106. In other words, the control device 104 determines the operational status of the BIOS 102 via the aforementioned handshake mechanism, and directly stores the execution log data already written into the temporary memory 108 to the debug reference data area 110 of the storage device 106 when the BIOS 102 might be in abnormal operation, and replace original operations of the BIOS 102.

Although the BIOS 102 periodically stores the execution log data written in the temporary memory 108 to the debug reference data area 110 of the storage device 106, in a case when the BIOS 102 crashes due to abnormal operations, the last written execution log data in the temporary memory 108 is cleared after power loss before it can be stored into the storage device 106. Therefore, the invention is capable of securing the most crucial execution log data via using the control device 104 to store the execution log data already written into the temporary memory 108 to the debug reference data area 110 of the storage device 106. Thus, in this embodiment, when the identification information in the reply information conforms to the original identification information, the execution log data in the temporary memory 108 is stored to the debug reference data area 110 of the storage device 106 by the BIOS 102; conversely, when the identification information in the reply information does not conform to the original identification information, the execution log data in the temporary memory 108 is stored to the debug reference data area 110 of the storage device 106 by the control device 104, instead. Simply put, the control device 104 can store the execution log data which has not yet been stored by the BIOS 102 to the storage device 106, for subsequent debugging purposes.

Moreover, in Step 208, if the BIOS 102 does not transmit the reply information, it may also be determined that the BIOS 102 might be in abnormal operational status; therefore, when the control device 104 does not detect the reply information within a specific time, the control device 104 can also store the execution log data in the temporary memory 108 to the debug reference data area 110 of the storage device 106. On the other hand, since the control device 104 controls the system power supply to provide power to each component, it is possible to ensure the storage procedure can be finished completely before power loss by using the control device 104 to store data when operation of the BIOS 102 is abnormal or terminated.

In Step 210, it is possible to use the control device 104 or other devices to determine whether the computer system 10 is in normal operation. If so, Step 204 is executed, and Steps 204 to 208 are performed. If the computer system crashes or other abnormalities occur, then Step 212 is further executed. Therefore, in Step 212, when the computer system is operating abnormally, the user may read the stored execution log data in the aforementioned steps from the storage device 106, and perform debugging procedures accordingly.

Figure 3:
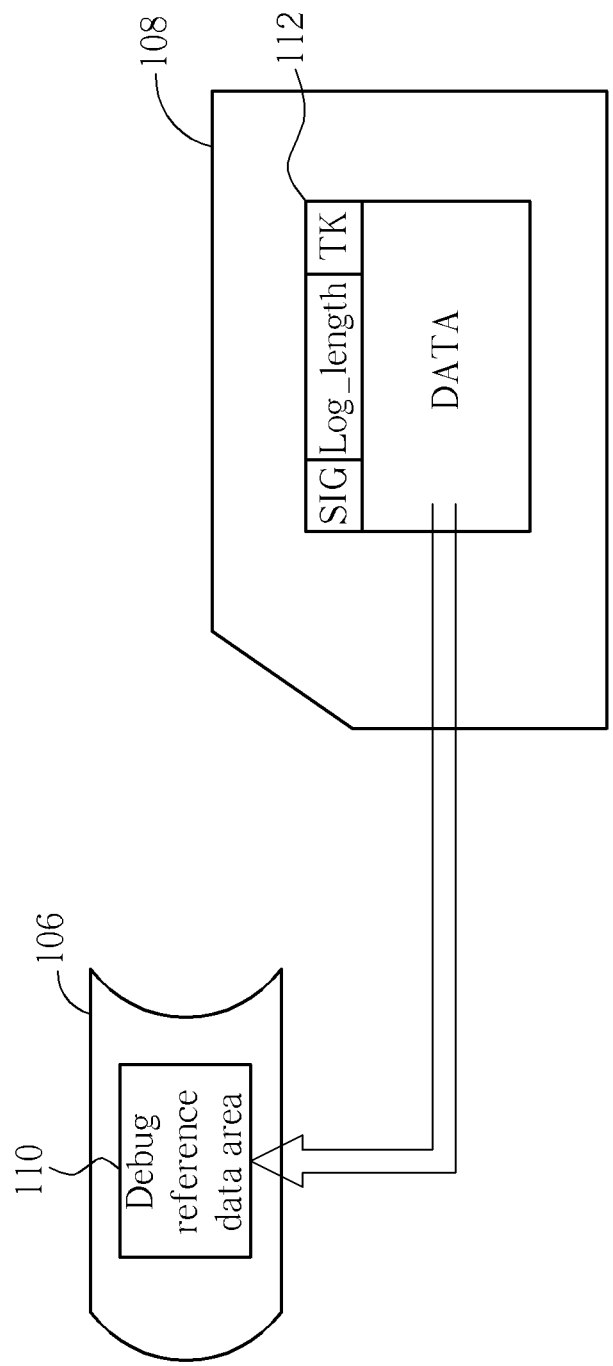
FIG. 3 is a schematic diagram of an execution log data storage process according to an embodiment of the invention.

The following further illustrates using a POST of the BIOS 102 as an example. Assume that the BIOS performs hardware tests on peripherals (e.g. memory, hard drive, communication ports, etc.) to check for operational status and perform related initialization procedures after the system power supply is turned on. First, before the BIOS 102 performs the self-test, the BIOS 102 may define the debug reference data area 110 in the storage device 106 and notify the control device 104 to start performing the execution log data service. Next, related execution log data during the self test procedure of the BIOS 102 starts to be written into the memory mapping area 112 of the temporary memory 108. For example, please refer to FIG. 3, which is a schematic diagram of a process for storing the execution log data. When the BIOS 102 performs the self test, the BIOS 102 writes a signature information and a data length information into a signature field SIG and a data length field Log_Length of the memory mapping area 112, respectively, and also writes the corresponding execution log data into a data field DATA of the memory mapping area 112. The BIOS 102 periodically moves the execution log data already written in the temporary memory 108 to the debug reference data area 110 of the storage device 106. On the other hand, after the BIOS 102 notifies the control device 104 to start performing the execution log data service, the control device 104 starts transmitting the reply request including the identification information to the BIOS 102. Next, the BIOS 102 transmits the reply information corresponding to the identification information according to the reply request. For example, after receiving the reply request, the BIOS 102 may write the reply information into an identification field TK of the memory mapping area 112. As such, the control device 104 may determine the operational status of the BIOS 102 via checking whether the data in the identification field TK conforms to the original identification information. When the control device 104 detects the identification information in the identification field TK of the reply information does not conform to the original identification information, the control device 104 stores the execution log data in the data field DATA into the debug reference data area 110 of the storage device 106. Moreover, since the BIOS 102 periodically (at intervals of a write cycle) stores the execution log data written in the temporary memory 108 to the debug reference data area 110; therefore, the control device 104 may also store newly-added data (i.e. the data not being stored to the debug reference data area 110 by the BIOS 102) within the data field DATA to the debug reference data area 110 of the storage device 106 according to the information in the signature field SIG and the data length field Log_Length. Therefore, if the control device 104 periodically transmits the reply request to the BIOS 102, and continuously checks the reply information in the memory mapping area 112, the execution log data in the temporary memory 108 may be securely transferred to the debug reference data area 110, and would not be lost. In such a case, each time the system crashes, the user may perform system debugging to pinpoint the error via reading and analyzing the execution log data stored in the debug reference data area 110 of the storage device 106.

In summary, the present invention allows the control device 104 to store the execution log data not yet stored to the storage device 106 by the BIOS 102 to the storage device 106, via the handshake mechanism. As such, the user may perform system debugging to easily locate the error via reading and analyzing the execution log data stored in the storage device 106. Compared with the prior art, the invention enables debugging messages to be obtained via the existing BIOS 102 and control device 104 without resorting to any additional external hardware. Furthermore, even if the computer system crashes and is unable to complete the boot procedure properly, the invention also allows the execution log data to be stored for debugging purposes.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A debugging method for a computer system, comprising:
    defining a debug reference data area in a storage device for a basic input/output system (BIOS) and a control device;
    utilizing the control device to periodically transmit a reply request comprising a first identification information to the BIOS;
    utilizing the BIOS to transmit a reply information comprising a second identification information according to the reply request while receiving the reply request transmitted by the control device;
    utilizing the control device to check the reply information, and store an execution log data into the debug reference data area of the storage device when the second identification information included in the reply information does not conform to the first identification information transmitted by the control device;
    determining whether the computer system is in a normal operation; and
    performing a debugging process of the computer system according to the execution log data when the determination result indicates the computer system is in an abnormal operation.

2. The debugging method of claim 1, wherein the step of defining the debug reference data area in the storage device for the BIOS and the control device of the computer comprises:
utilizing the BIOS to define the debug reference data area in the storage device, and ensuring the control device can access data from the debug reference data area; and
utilizing the BIOS to store the execution log data into the debug reference data area.

3. The debugging method of claim 2, wherein the step of utilizing the BIOS to store the execution log data into the debug reference data area further comprises:
utilizing the BIOS to notify the control device to start performing an execution log data service.

4. The debugging method of claim 2, wherein the step of utilizing the BIOS to store the execution log data into the debug reference data area comprises:
utilizing the BIOS to write a signature information, a data length information and the execution log data into a signature, a data length field and a data field of a temporary memory, respectively; and
utilizing the BIOS to write the execution log data into the debug reference data area at intervals of a write cycle according to the signature information and the data length information.

5. The debugging method of claim 4, wherein the step of utilizing the BIOS to transmit the reply information comprising the second identification information according to the reply request comprises:
utilizing the BIOS to write the reply information comprising the second identification information into the identification field of the temporary memory according to the reply request.

6. The debugging method of claim 5, wherein the step of utilizing the control device to check the reply information, and storing the execution log data to the debug reference data area of the storage device when the second identification information included in the reply information does not conform to the first identification information transmitted by the control device comprises:
utilizing the control device to check whether the reply information recorded in the identification field of the temporary memory conforms to the first identification information transmitted by the control device; and
utilizing the control device to store the execution log data of the data field to the debug reference data area when the check result indicates the reply information does not conform to the first identification information.

7. The debugging method of claim 6, wherein when the step of utilizing the control device to store the execution log data of the data field to the debug reference data area when the check result indicates the reply information does not conform to the first identification information comprises:
utilizing the control device to store a part of the execution log data of the data field to the debug reference data area according to the data length recorded in the data length field when the check result indicates the reply information does not conform to the first identification information.

8. The debugging method of claim 1, wherein the step of utilizing the control device to check the reply information, and storing the execution log data to the debug reference data area of the storage device when the second identification information included in the reply information does not conform to the first transmitted identification information further comprises:
utilizing the control device to detect the reply information and utilizing the control device to store the execution log data into the debug reference data area of the storage device when the control device does not detect the reply information within a first period of time.

9. A computer system, comprising:
a storage device;
a basic input/output system (BIOS), for defining a debug reference data area in the storage device;
a control device, for periodically transmitting a reply request comprising a first identification information to the BIOS; and
a temporary memory, for temporarily storing an execution log data;
wherein after the BIOS transmits a reply information comprising a second identification information according to the reply request while receiving the reply request transmitted by the control device, and when the second identification information included in the reply information does not conform to the first transmitted identification information, the control device stores the execution log data in the temporary memory into the debug reference data area of the storage device.

10. The computer system of claim 9, wherein the BIOS stores the execution log data into the debug reference data area after defining the debug reference data area and ensuring the control device is capable of accessing data from the debug reference data area.

11. The computer system of claim 10, wherein the BIOS notifies the control device to start performing an execution log data service.

12. The computer system of claim 10, wherein after a signature information, a data length information and the execution log data are written into a signature field, a data length field and a data field in the temporary memory, respectively, the BIOS writes the execution log data into the debug reference data area at intervals of a write cycle according to the signature information and the data length information.

13. The computer system of claim 12, wherein the BIOS writes the reply information comprising the second identification information into the identification field of the temporary memory according to the reply request.

14. The computer system of claim 13, wherein the control device stores the execution log data of the data field to the debug reference data area after checking indicates the reply information recorded in the identification field of the temporary memory does not conform to the first identification information.

15. The computer system of claim 14, wherein the control device stores a part of the execution log data of the data field to the debug reference data area according to the data length recorded in the data length field after checking indicates the reply information recorded in the identification field of the temporary memory does not conform to the first identification information.

16. The computer system of claim 9, wherein the control device detects the reply information and the control device stores the execution log data into the debug reference data area of the storage device when the control device does not detect the reply information within a first period of time.

* * * * *